United States Patent [19]
Andrini

[11] Patent Number: 5,738,262
[45] Date of Patent: Apr. 14, 1998

[54] REAR MOUNTED STORAGE UNIT

[76] Inventor: Jeffrey L. Andrini, 815 Jackson Ave., St. Charles, Ill. 60174

[21] Appl. No.: 869,615

[22] Filed: Jun. 5, 1997

[51] Int. Cl.⁶ .................................................. B60R 9/06
[52] U.S. Cl. .......................... 224/572; 224/527; 224/526; 224/488; 296/37.1
[58] Field of Search ........................ 224/488, 495, 224/496, 497, 498, 522–527, 42.32, 42.33, 42.34, 42.38, 42.39, 572, 328, 463, 329; 383/22, 23, 24; 296/37.1, 37.6

[56] References Cited

U.S. PATENT DOCUMENTS

| | | | |
|---|---|---|---|
| 470,878 | 3/1892 | Mease | 224/463 |
| 1,232,371 | 7/1917 | Morrison | 224/527 |
| 2,541,244 | 2/1951 | Hack . | |
| 3,228,576 | 1/1966 | Gaukel . | |
| 3,333,751 | 8/1967 | Brown | 224/572 |
| 3,968,913 | 7/1976 | Weed et al. | 224/488 |
| 3,999,693 | 12/1976 | Cooper, Sr. . | |
| 4,050,614 | 9/1977 | Simpson | 224/328 |
| 4,320,862 | 3/1982 | Bettenhausen . | |
| 4,671,439 | 6/1987 | Groeneweg . | |
| 4,756,457 | 7/1988 | Polk . | |
| 4,809,891 | 3/1989 | Patrin | 224/527 |
| 4,907,728 | 3/1990 | Giblet | 224/527 |
| 4,957,228 | 9/1990 | Balka . | |
| 5,096,107 | 3/1992 | VanSon | 224/328 |
| 5,314,101 | 5/1994 | White . | |

*Primary Examiner*—Henry J. Recla
*Assistant Examiner*—Gregory M. Vidovich
*Attorney, Agent, or Firm*—Mathew R. P. Perrone, Jr.

[57] ABSTRACT

A flexible and foldable storage unit is attached to a rear portion of a vehicle, with a strap assembly to provide for a strong attachment. This strap assembly can be easily secured to or removed from a vehicle, especially a mini-van.

19 Claims, 2 Drawing Sheets

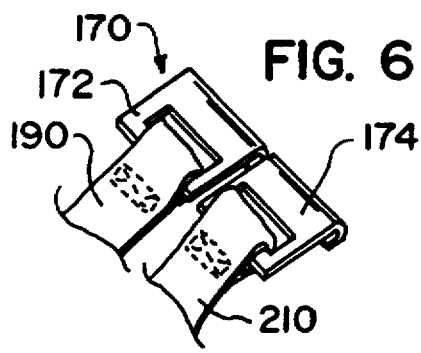
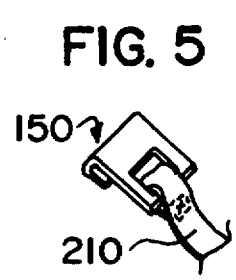
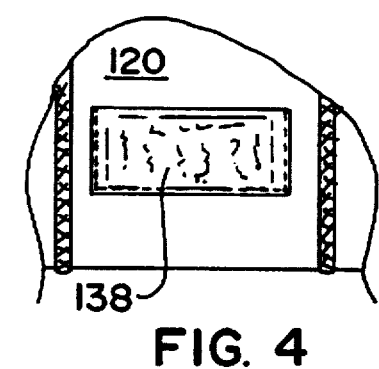
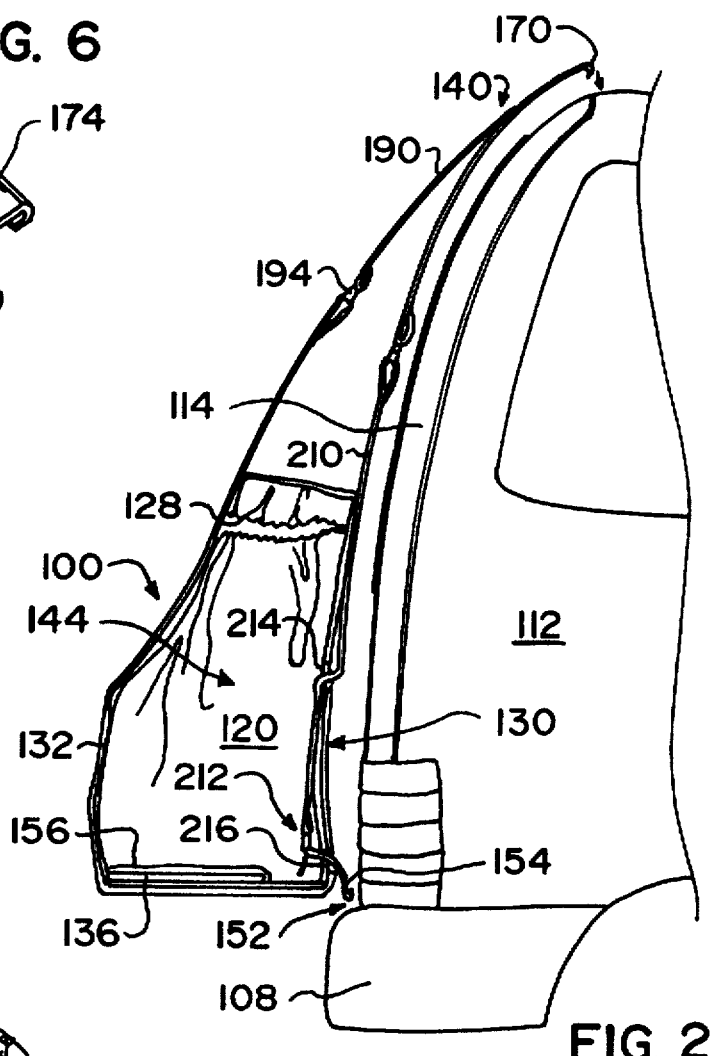
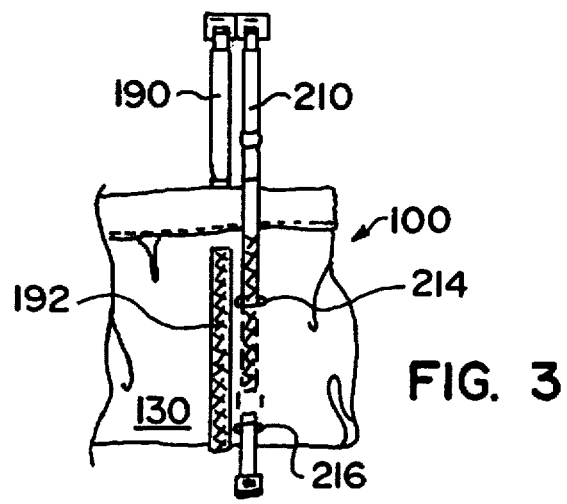

5,738,262

REAR MOUNTED STORAGE UNIT

BACKGROUND OF THE INVENTION

One of the most popular vehicles in the United States is generically called a rear hatch vehicle. These rear hatch vehicles tend to provide a maximum interior space with minimized exterior size.

A special type of a rear hatch vehicle is called a mini-van. All three major automobile manufactures in the United States make at least one version of a mini-van. Several automobile manufactures domiciled outside of the United States also make a version of a mini-van.

These rear hatch vehicles, such as mini-vans, provide space for cargo and trade usage, as well as comfort for large families. These advantages are obtained, while permitting a more aesthetically desirable vehicle, with improved handling and comfort, especially when compared to a full-sized van.

The mini-vans also provide more interior space than a station wagon. This interior space is accomplished in a vehicle of shorter length. The shorter length can improve handling and maneuverability of the vehicle.

It is, however, desirable at times to have extra storage space. Requirements of these carrying devices must mean that they must be easily attached, strongly supported, and easily accessible. These three features for the storage unit must also not be contradictory.

Sometimes, additional storage space is found in a roof top carrier. This roof top carrier does not interfere with a driver's line of sight. It does, however, destroy the streamlined characteristics of the vehicle, and greatly increase wind resistance. It also lacks both accessibility and ease of attachment, especially in view of the height of the vehicle.

The roof top carrier avoids interference with the bumper of a vehicle. Such interference is almost inherent with a rear mounted storage container. These rear mounted carriers lack flexibility and ease of attachment. Also, the rear mounted carriers interfere with the exterior design of the vehicle. It is very desirable to provide a rear mounted storage, which does not interfere with the vehicle design, such as the bumper.

These storage units are also hard to store either in place on a vehicle or off the vehicle. Due to the space occupied caused by the size of the unit, the storage unit capacity causes the in place or on a vehicle storage problem. It can also cause a storage problem for the vehicle in the dwelling place.

It is difficult to achieve these goals. Easily attached and strongly supported are many times contradictory. Ease of attachment requires simplicity of attachment, ease of adjustment, and ease of access to the carrier. If these features can be maximized, the desired results can be obtained.

SUMMARY OF THE INVENTION

Among the many objectives of this invention is to provide a storage unit for use to be easily mounted on the exterior rear portion of a rear hatch vehicle.

Another objective of this invention is to provide a storage unit for a rear hatch vehicle.

Yet another objective of this invention is to provide a storage unit, which is easily attached to a rear hatch vehicle.

Still another objective of this invention is to provide a storage unit, which leaves license plate visible.

Additionally, an objective of this invention is to provide a flexible storage unit.

Also, an objective of this invention is to provide a covered storage unit.

A further objective of this invention is to provide an accessible storage unit.

A still further objective of this invention is to provide an easily removable storage unit.

Yet a further objective of this invention is to provide a storage unit with support.

Another objective of this invention is to provide a storage unit for a rear hatch vehicle, which offers minimal wind resistance.

Yet another objective of this invention is to provide a storage unit, which is easily attached to a rear hatch vehicle.

Still another objective of this invention is to provide a storage unit, which does not block a driver's line of sight.

Additionally, an objective of this invention is to provide a flexible storage unit, which can fold for easy storage.

Also, an objective of this invention is to provide a covered storage unit for a rear hatch vehicle.

A further objective of this invention is to provide an accessible storage unit for a rear hatch vehicle.

A still further objective of this invention is to provide an easily stored in place storage unit.

Yet a further objective of this invention is to provide a storage unit, which may be easily stored off of the vehicle.

Another objective of this invention is to provide a storage unit for a rear hatch vehicle, which offers minimal interference with the van structure.

These and other objectives of the invention (which other objectives become clear by consideration of the specification, claims and drawings as a whole) are met by providing a storage unit to be attached to a rear portion of a vehicle, with a strap assembly to provide for a strong attachment, which can be easily secured to or removed from a vehicle, especially a mini-van.

BRIEF DESCRIPTION OF DRAWINGS

FIG. 2 depicts a side view of storage unit 100 mounted on the rear portion 110 of a mini-van 112 with strap assembly 140, around container 120.

FIG. 3 depicts a partial rear plan view of storage unit 100 mounted on the rear portion 110 of a mini-van 112 showing part of first strap mechanism 190 and second strap mechanism 210.

FIG. 4 depicts a partial front plan view of storage unit 100 showing part of first strap mechanism 190 and showing transparent window envelop 138 which allows a license plate to be received therein.

FIG. 5 depicts a perspective view of lower clip assembly 150 for use with strap assembly 210.

FIG. 6 depicts a perspective view of upper clip assembly 170 for use with strap assembly 210 and 190.

Throughout the figures of the drawings where the same part appears in more than one figure the same number is applied thereto.

DESCRIPTION OF PREFERRED EMBODIMENTS

Figure 1:
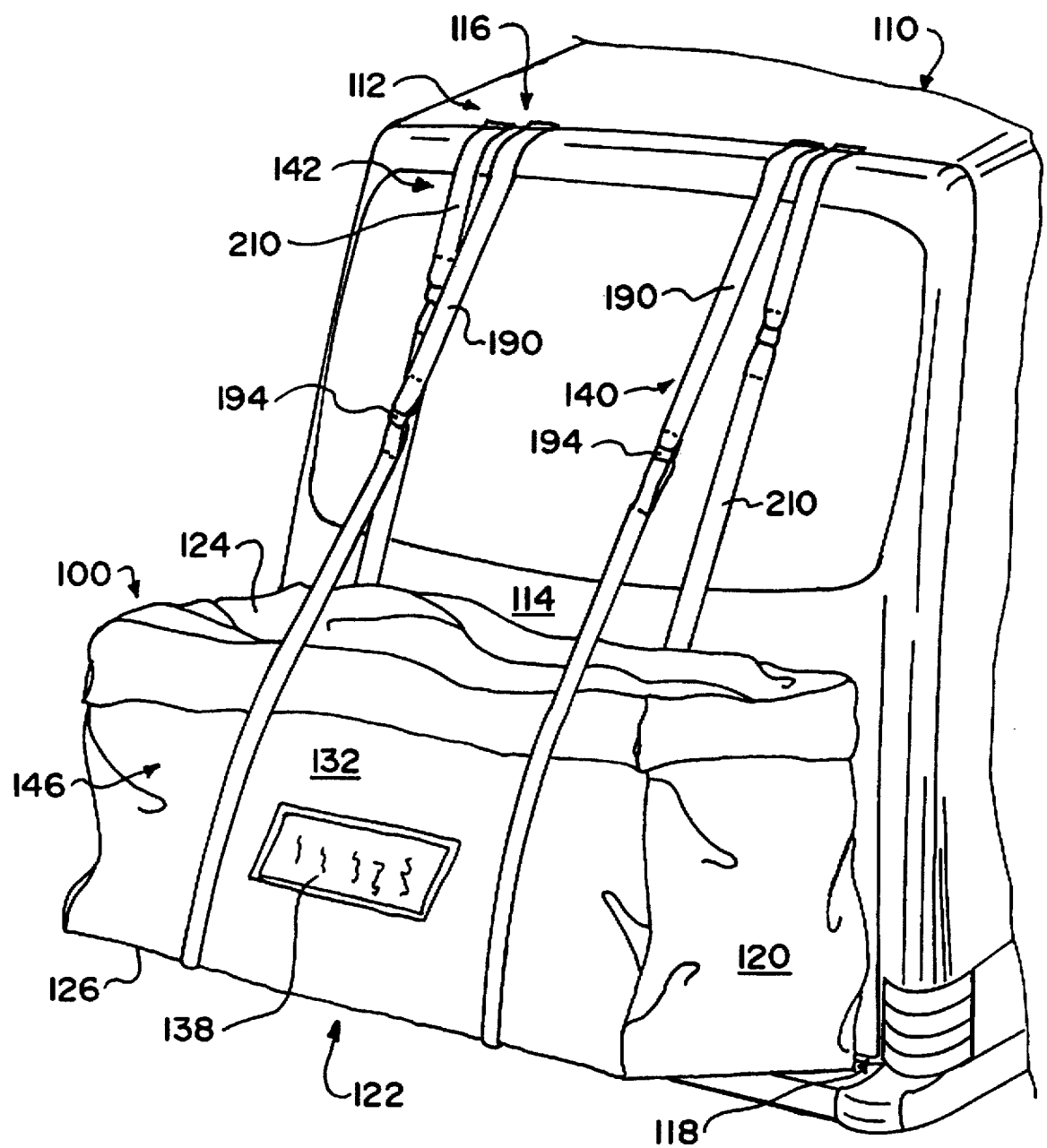
FIG. 1 depicts a front perspective view of storage unit 100 mounted on the rear portion 110 of a mini-van 112.

The storage unit includes a basically soft sided container mounted onto the vehicle by a first strap assembly and a second strap assembly. Each of the first strap assembly and second strap assembly includes a first strap mechanism and a second strap mechanism. This luggage unit is especially suitable for use on a rear hatch vehicle such as a mini-van, or other vehicle having a flat back, especially a rear hatch vehicle. Due to the soft sides of the container, the storage unit may be folded when not in use, and more easily stored.

Each of the first strap assembly and second strap assembly includes a first strap mechanism and a second strap mechanism. The first strap mechanism is secured at one point to the rearward portion of the container or bag. The second strap mechanism has a part thereof slidably mounted in the rear portion of the bag. By rear portion is meant the portion adjacent to the vehicle.

The first strap mechanism extends from the rear portion of the container and is secured around the bottom of the container. From the bottom, the first strap mechanism extends around the front of the container to the top of the mini-van or other vehicle. The first strap mechanism is thus secured to the rearward portion of the bag and is clipped or otherwise secured onto the upper part of the rear door of the van.

On the first strap mechanism is a first adjustment buckle, which permits the first strap mechanism to be shortened or lengthened as required for securing to the vehicle. This first strap mechanism is completely on the exterior of the container. This adjustment buckle is preferably situated between the top of the vehicle and the top of the container for ease of adjustment.

The second strap mechanism is partially and slidably mounted within the interior of the container as an interior strap. On the interior strap is a second adjustment buckle for tightening the strap. This second adjustment buckle is preferably within the interior of bag and tightens the strap mechanism between its attachment at the top of the rear door and the bottom of the rear door.

The container has a first rear slot and a second rear slot to receive the second strap mechanism. The second adjustment buckle is preferably within the container.

The second strap mechanism has a lower hook at one end thereof. The lower hook is designed to receive the lower edge of the rear hatch door on the vehicle. Oppositely disposed from the lower hook is an upper hook designed to attach to the upper edge of the rear hatch door on the vehicle. Thus, second strap mechanism may be easily attached to or removed from the vehicle.

The first strap mechanism is also preferably secured to an upper hook designed to attach to the upper edge of the hatch door of the vehicle. A separate upper hook is preferred for each of the first strap mechanism and the second strap mechanism. Thus, first strap mechanism may be easily attached to or removed from the vehicle. While a separate upper hook may be used for each of first strap mechanism and second strap mechanism and is preferred, the single hook is also an effective upper attachment.

The pack or container for the rear storage unit may or may not be braced at the base with a solid member. Preferably, however, it is preferably braced at least in the base. Within the base is a pocket, which pocket covers a substantial portion of the base. The pocket is spaced from the bumper of the vehicle. The flexibility of the storage unit permits the unit to fit around the vehicle bumper, if required.

It may be optionally braced on the sides. At the top of the container is a slide fastening member which permits the container to be opened. The slide fastener may be replaced by a hook and loop assembly or other appropriate means for securing the top of the storage unit in place.

If desired in place, a transparent window envelop may be on the exterior of the bag in order that the license plate on the rear of the vehicle is not obscured. While it possible that storage unit may not require the envelop for the license plate, it is the preferred version, because to maximize the advantage of the storage unit, it will usually be necessary to block the standard plate mount. In this fashion, the maximized advantage of the mini-van or other hatch back vehicle with increased luggage space can be obtained.

The container is preferably a durable bag made of a flexible material. This flexible material means that the storage unit may be folded or collapsed. In the folded or collapsed state, the container is more easily stored.

The general shape of the container is that of a hollow rectangular solid or a box having six panels. Five of the panels are substantially and permanently interconnected. The top panel thus provides a removable cover for the container.

Letting four of the six panels form the sides of the storage unit, the top panel is preferably removably securable to three of four sides and oppositely disposed from the bottom of the container. The top panel is preferably permanently secured to the fourth side and removably secured to the other three sides.

The securing mechanism for the top panel to the container is preferably a durable slide fastener, commonly referred to as a zipper. However, a hook and loop assembly (typically available under the Trademark VELCRO) may also be used.

The container may or may not be braced at the base with a solid member. It may also be optionally braced on the sides. At the top of the container is a slide fastening member, which permits the container to be opened. The slide fastener may be replaced by the hook and loop assembly or other appropriate means for securing the storage unit in place.

Referring now to FIG. 1 and FIG. 2, storage unit 100 is mounted on the rear portion 110 of a mini-van 112. Storage unit 100 is mounted on the rear portion 110 of a mini-van 112 with strap assembly 140.

The storage unit 100 includes a basically soft sided container 120. Five of the panels are interconnected to form a base 122 for container 120. The top panel 124 is preferably removably securable to the base 122 on three sides and oppositely disposed from the bottom 126 of the container 120.

A zipper 128 is preferred device for securing top panel 124 to base 122. Other fasteners may also be used. The zipper 128 is, however, the most efficient attachment.

The container 120 may or may not be braced at the bottom 126 with a solid member 136, shown. If solid member 136 as a flat panel, is present, it fits into pocket 156 sewn or otherwise secured onto bottom 126 on the interior 144 of container 120. Pocket 156 is of sufficient size to receive and support solid member 136. Solid member 136 may have its size adjusted so that the flexibility of container 120, permits a fit around bumper 108 of vehicle 110.

Container 120 may also be optionally braced on the sides. Such bracing may take a standard form, such as rods. Bracing may occur by the load in the container itself.

If desired in place, a transparent window envelop 138 is preferably situated on the exterior 146 of the container 120 in order that the license (not shown) plate on the rear of the vehicle 112 may be received therein and is not obscured by the storage unit 100.

Adding FIG. 3 and FIG. 4 to the consideration, storage unit 100 is mounted on the rear portion 110 of a mini-van 112 showing first strap assembly 140 and second strap assembly 142. Each of first strap assembly 140 and second strap assembly 142 includes first strap mechanism 190 and second strap mechanism 210. First strap mechanism 190 and second strap mechanism 210 combine to permit the storage unit 100 to be easily attached to or removed from the mini-van 112 or vehicle.

The first strap mechanism 190 is secured by stitches 192 at one end to the vehicle adjacent or rearward portion 130 of the container 120 or bag. The second strap mechanism 210 has a part thereof slidably mounted in the rear portion 130 of the container 120.

The first strap mechanism 190 extends from the rear portion 130 of the container 120 at the secured point 192 and around the bottom 126 of the container 120. From the bottom 126, the first strap mechanism 190 goes around the front 132 of the container to the top 116 of the mini-van 112 or other vehicle. The first strap mechanism 190 is thus secured to the rearward portion 130 of the container 120, runs around the bottom thereof and up the front, and is then hooked or otherwise secured onto the upper part of the rear hatch door 114 of the van 112.

On the first strap mechanism 190 is a first adjustment buckle 194, which permits the first strap mechanism 190 to be shortened or lengthened as required for securing to the vehicle 112. The first adjustment buckle 194 can thus releasibly set the length of the first strap mechanism 190. This first strap mechanism 190 is completely on the exterior 146 of the container 120. This first adjustment buckle 194 is preferably situated between the top 116 of the vehicle 112 and the top 124 of the container 120 for ease of adjustment.

The second strap mechanism 210 is slidably mounted within the interior 144 of the container 120 as an interior strap. On the second strap mechanism 210 is a second adjustment buckle 212 for tightening the second mechanism strap 210 between the top of the rear door 114 and the bottom 118 of the rear door 114.

The container 120 has a first rear slot 214 and a second rear slot 216 to receive the second strap mechanism 210. The second adjustment buckle 212 is preferably within the container 120. The first adjustment buckle 194 and the second adjustment buckle 212 may be the same or different types.

In a preferred form, both first adjustment buckle 194 and the second adjustment buckle 212 contain the strap assembly. Thus, there is no free strap left to flap in the breeze. Storage unit 100 then becomes adjustable in a very efficient manner.

With the addition of FIG. 5, a perspective view of lower clip assembly 150 for use with second strap mechanism 210 is shown. Lower clip assembly 150 fits on the bottom 152 of the hatch door and secures the lower end of second strap mechanism 210 to the vehicle 112.

FIG. 6 depicts a perspective view of upper clip assembly 170 having a first upper hook 172 receiving first strap mechanism 190 and a second upper hook 174 receiving second strap mechanism 210. First strap slot 214 is thus oppositely disposed from stitches 192, while second strap slot 216 is oppositely disposed from lower clip assembly 150.

The second strap mechanism 210 has a lower door hook 154 on lower clip assembly 150. The lower door hook 154 is an arc designed to receive the bottom 118 of hatch door 114 of vehicle 112. Oppositely disposed from the lower door hook 154 is upper clip assembly 170 designed to attach to vehicle 112 at any appropriate spot. Preferably, that spot in the upper part of the rear door 114 of the vehicle 112.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A storage unit adapted for attachment to a rear portion of a vehicle, the storage unit comprising:

(a) a container and a strap apparatus combining to provide the storage unit;

(b) the container being formed of flexible material;

(c) the strap apparatus being adapted to secure the container to the rear portion of the vehicle;

(d) the strap apparatus including a first strap assembly and a second strap assembly;

(e) the first strap assembly being similar in structure to the second strap assembly;

(f) the first strap assembly including a first strap mechanism and a second strap mechanism;

(g) the first strap mechanism being secured at a first point to a rear panel of the container;

(h) the second strap mechanism being slidably mounted through the rear panel of the container;

(i) the first strap mechanism extending from the rear panel of the container and being secured around a bottom of the container; and (j) the first strap mechanism extending from the bottom of the container around the front of the container.

2. The storage unit of claim 1 further comprising:

(a) the first strap mechanism extending from the front of the container to an attachment point; and (b) a first adjustment buckle for the first strap mechanism being adapted to adjust a length of the first strap mechanism.

3. The storage unit of claim 2 further comprising:

(a) the first strap mechanism being situated on an exterior of the container;

(b) the first adjustment buckle for the first strap mechanism being situated above the container.

4. The storage unit of claim 3 further comprising:

(a) the second strap mechanism being partially mounted within the container; and (b) the second strap mechanism having an interior strap mounted within the container.

5. The storage unit of claim 4 further comprising:

(a) a second adjustment buckle being mounted on the interior strap; and (b) the second strap mechanism having a top attachment and bottom attachment.

6. The storage unit of claim 5 further comprising:

(a) the container having a first rear slot and a second rear slot to receive the interior strap of the second strap mechanism therebetween;

(b) the first rear slot being situated above the second rear slot; and (c) the first rear slot and the second rear slot being situated adjacent to the vehicle when mounted thereon.

7. The storage unit of claim 6 further comprising:

(a) the storage unit being adaptable to a stored position for the storage unit;

(b) the storage unit being adaptable to a mounted position for the storage unit; and (c) the first adjustment buckle and the second adjustment buckle adapting the storage unit to a desired position selected from the group consisting of a mounted position and a stored position.

8. The storage unit of claim 7 further comprising:

(a) the second strap mechanism comprising a flexible strap which includes the interior strap;

(b) the flexible strap having a lower hook at a first end thereof defining the bottom attachment;

(c) the flexible strap having an upper hook at a second end thereof defining the top attachment;

(d) the lower hook being oppositely disposed from the upper hook;

(e) the lower hook being adapted to receive a lower edge of a door on the rear portion of the vehicle; and (f) the upper hook being adapted to receive an upper edge of the door on the rear portion of the vehicle.

9. The storage unit of claim 7 further comprising:

(a) the first strap mechanism including a first flexible strap;

(b) the first flexible strap having a first upper hook secured to an upper end thereof;

(c) the first upper hook being adapted to receive an upper edge of the door on the rear portion of the vehicle.

10. The storage unit of claim 9 further comprising:

(a) the second strap mechanism comprising a flexible strap which includes the interior strap;

(b) the flexible strap having a lower hook at a first end thereof defining the bottom attachment;

(c) the flexible strap having an upper hook at a second end thereof defining the top attachment;

(d) the lower hook being oppositely disposed from the upper hook;

(e) the lower hook being adapted to receive a lower edge of a door on the rear portion of the vehicle; and (f) the upper hook being adapted to receive the upper edge of the door on the rear portion of the vehicle.

11. The storage unit of claim 10 further comprising:

(a) the stored position being a folded and compact position; and (b) the container being formed of a braceable material.

12. The storage unit of claim 11 further comprising:

(a) the container having a base panel;

(b) the container having the rear panel secured to the base panel;

(c) the container having a front panel secured to the base panel;

(d) the container having a first side and a second side;

(e) the first side and the second side being secured to opposing ends of the base panel, the rear panel and the front panel secured to the first and second sides; and (f) the container having a top panel adaptable to contact the first side, the second side, the front panel, and the rear panel.

13. The storage unit of claim 12 further comprising:

(a) the top panel being oppositely disposed from the base panel;

(b) the top panel being secured to the rear panel; and (c) the top panel being removably securable to the front panel, the first side and the second side.

14. The storage unit of claim 13 further comprising:

(a) the container having a bracing means in the base panel;

(b) the container having a visible envelop adapted to receive a license plate in the front panel.

15. The storage unit of claim 14 further comprising:

(a) the bracing means having a base pocket in the base panel;

(b) the base pocket receiving a rigid member to support the base panel;

(c) the base pocket partially covering the base panel to thereby permit the base panel to adapt to a bumper of the vehicle.

16. A storage unit adapted for attachment to a rear portion of a vehicle, the storage unit comprising:

(a) a container and a strap apparatus combining to provide the storage unit;

(b) the container being formed of a flexible material;

(c) the strap apparatus being adapted to secure the container to the rear portion of the vehicle and thereby attach the storage unit to the vehicle;

(d) the strap apparatus including a first strap assembly and a second strap assembly;

(e) the first strap assembly being similar in structure to the second strap assembly;

(f) the first strap assembly including a first strap mechanism and a second strap mechanism;

(g) the first strap mechanism being secured at a first point to a rear panel of the container;

(h) the second strap mechanism being slidably mounted through the rear panel of the container;

(i) the first strap mechanism extending from the rear panel of the container and being secured around a bottom of the container;

(j) the first strap mechanism extending from the bottom of the container around the front of the container;

(k) the first strap mechanism extending from the front of the container to an attachment point; and (l) a first adjustment buckle for the first strap mechanism being adapted to adjust a length of the first strap mechanism; and (m) the container having a means for displaying license plate.

17. The storage unit of claim 16 further comprising:

(a) the second strap mechanism being partially mounted within the container;

(b) the first strap mechanism being situated on an exterior of the container;

(c) the first adjustment buckle for the first strap mechanism being situated above the container;

(d) the second strap mechanism having an interior strap mounted within the container;

(e) a second adjustment buckle being mounted on the interior strap;

(f) the second strap mechanism having a top attachment and a bottom attachment;

(g) the container having a first rear slot and a second rear slot to receive the interior strap of the second strap mechanism therebetween;

(h) the first rear slot being situated above the second rear slot;

(i) the first rear slot and the second rear slot being situated adjacent to the vehicle when mounted thereon;

(j) the storage unit being adaptable to a stored position for the storage unit;

(k) the storage unit being adaptable to a mounted position for the storage unit;

(l) the first adjustment buckle and the second adjustment buckle adapting the storage unit to a desired position selected from the group consisting of a mounted position and a stored position;

(m) the second strap mechanism comprising a flexible strap which includes the interior strap;

(n) the flexible strap having a lower hook at a first end thereof defining the bottom attachment;

(o) the flexible strap having an upper hook at a second end thereof defining the top attachment;

(p) the lower hook being oppositely disposed from the upper hook;

(q) the lower hook being adapted to receive a lower edge of a door on the rear portion of the vehicle;

(r) the upper hook being adapted to receive an upper edge of the door on the rear portion of the vehicle;

(s) the first strap mechanism including a first flexible strap; and (t) the first flexible strap having a first upper hook secured to an upper end thereof.

18. The storage unit of claim 17 further comprising:

(a) the first upper hook being adapted to receive an upper edge of the door on the rear portion of the vehicle;

(b) the stored position being a folded and compact position;

(c) the container being formed of a braceable material;

(d) the container having a base panel;

(e) the container having the rear panel secured to the base panel;

(f) the container having a front panel secured to the base panel;

(g) the container having a first side and a second side;

(h) the first side and the second side being secured to opposing ends of the base panel, the rear panel and the front panel secured to the first second sides; and (i) the container having a top panel adaptable to contact the first side, the second side, the front panel, and the rear panel.

19. In combination, a vehicle having a hatchback, with improved storage capability, and an externally mounted storage unit, the improvement comprising the externally mounted storage unit further comprising:

(a) a storage unit being adapted for attachment adjacent to the hatchback;

(b) a container and a strap apparatus combining to provide the storage unit;

(c) the container being formed of a flexible material;

(d) the strap assembly being adapted to secure the container to the rear portion of the vehicle and thereby attach the storage unit to the vehicle;

(e) the strap apparatus including a first strap assembly and a second strap assembly;

(f) the first strap assembly being similar in structure to the second strap assembly;

(g) the first strap assembly including a first strap mechanism and a second strap mechanism;

(h) the first strap mechanism being secured at a first point to a rear panel of the container;

(i) the second strap mechanism being slidably mounted through the rear panel of the container (j) the first strap mechanism extending from the rear panel of the container and being secured around a bottom of the container;

(k) the first strap mechanism extending from the bottom of the container around the front of the container;

(l) the first strap mechanism extending from the front of the container to an attachment point;

(m) a first adjustment buckle for the first strap mechanism being adapted to adjust a length of the first strap mechanism;

(n) the container having means for displaying a license plate;

(o) the container having a base panel, a front panel, a first side panel, a second side panel, and a top panel wherein the top panel being oppositely disposed from the base panel;

(p) the top panel being secured to the rear panel; and (q) the top panel being removably securable to the front panel, the first side panel and the second side panel.

* * * * *